Patented Apr. 30, 1940

2,198,973

UNITED STATES PATENT OFFICE 2,198,973

METHOD FOR REDUCING THE VISCOSITY OF CHLORINATED RUBBER

John Merriam Peterson, Kennett Square, Pa., assignor to Hercules Powder Company, Wilmington, Del., a corporation of Delaware No Drawing. Application March 11, 1938, Serial No. 195,321

8 Claims. (Cl. 260—772)

This invention relates to a method for reducing the viscosity of chlorinated rubber.

It is well known that rubber can be transformed to a chlorinated derivative thereof by treatment of the rubber with chlorine under various conditions, the chlorination usually being carried out in a suitable solvent for rubber, such as carbon tetrachloride, or other solvent which does not react with the chlorine. Raw or crude rubber when dissolved in a solvent, such as, for example, carbon tetrachloride, swells greatly and eventually forms a very viscous solution which contains only a small concentration of rubber and, of course, a high concentration of solvent. In other words, raw or crude rubber is a highly polymerized product and consequently small concentrations thereof in a solvent produce very highly viscous solutions. Treatment of such a product with chlorine, for example, results then in a chlorinated product also having a very high viscosity.

For many purposes, however, such as, for example, lacquers, paints, varnishes and the like, it is impractical to use highly viscous products because to make such operable it is necessary to use large amounts of solvent, which is a serious economic disadvantage.

In order to prepare chlorinated rubber of lower viscosities, various methods have been proposed heretofore for accomplishing this object. It has been proposed to produce chlorinated rubber, capable of forming solutions of low viscosity, by disaggregating rubber by working on a mill and then chlorinating the disaggregated product. To disaggregate the rubber still further, the milled rubber, in solution in a suitable solvent, is exposed to daylight, or to ultra-violet light. As an alternative to, or in addition to the milling or mechanical disaggregation of the rubber, it may be oxidized, and this rubber, when dissolved in a suitable solvent, produces a solution of low viscosity. The viscosity characteristic of the rubber so produced depends to some extent on the degree of oxidation thereof. Chlorination of such oxidized rubber produces a lower viscosity product than the chlorination of a similar rubber not so treated.

Processes for obtaining chlorinated rubber of a low viscosity characteristic have been open to the objection that the viscosity characteristic is still considerable and higher than is desirable for many purposes. Furthermore, it is usually quite difficult to control a chlorination process so that a product is finally obtained which has the exact viscosity characteristics originally desired, especially if the object in view is a low viscosity chlorinated rubber.

It is the object of this invention to provide a method for reducing the viscosity of chlorinated rubber to the desired extent by treating chlorinated rubber after it has been substantially completed chlorinated.

I have found that the viscosity of chlorinated rubber, substantially completely chlorinated, may be reduced to the desired extent, and without appreciable further chlorination, by treating said chlorinated rubber in solution in a suitable solvent therefor with chlorine and an oxygen-containing gas for a period of time necessary to give the product of predetermined, reduced viscosity. I am aware that rubber has been chlorinated with chlorine and an oxygen-containing gas, for example, air, but the process in accordance with this invention differentiates from any process heretofore used because the chlorine and oxygen-containing gas are not used for chlorinating rubber, but for reducing the viscosity characteristic of chlorinated rubber after it has been substantially completely chlorinated.

In the practical adaptation of my invention, the process of reducing the viscosity will preferably be carried out in a solvent for chlorinated rubber. For this purpose, carbon tetrachloride or any other solvent for chlorinated rubber not affected by the chlorine or by the oxygen-containing gas may be used, among which are, for example, ethylene dichloride and chloroform.

In proceeding in accordance with my invention substantially completely chlorinated rubber made according to any of the methods known for chlorinating rubber in solution in a solvent such as, for example, carbon tetrachloride, is treated with chlorine and an oxygen-containing gas, such as, for example, air, until a predetermined, reduced viscosity is obtained. The time that the chlorinated rubber is treated with the air and chlorine will depend upon the viscosity desired. For example, to obtain a very low viscosity product the time during which the chlorinated rubber solution is treated with the air and chlorine will be longer than the time of treatment of the same chlorinated rubber solution to obtain a product of an intermediate viscosity. I have found that a mixture of the oxygen-containing gas, such as, for example, air, or oxygen alone, and chlorine may be passed into the chlorinated rubber solution continuously, the chlorine may be added intermittently to the air stream being passed into the chlorinated rubber solution, or the chlorine and air may be alternately passed into the chlorinated rubber solution.

I have found that my process may be carried out at room temperature or at elevated temperatures, for example, at about 50° C. to 60° C. The choice of a certain temperature will be governed by the particular chlorination cycle being used.

I have found that the amount of chlorine in the gas mixture comprising chlorine and an oxygen-containing gas may vary between wide limits but for most practical purposes it will vary from about 40% to 99.5% by weight. Concentrations of chlorine less than 40% by weight of the gas mixture are suitable under certain conditions, but in general I prefer the range before stated. When reducing the viscosity of substantially completely chlorinated rubber with a mixture of chlorine and air, I prefer that said mixture contain from about 70% to about 98% by weight of chlorine.

My viscosity reducing process may be carried out in the same apparatus in which the chlorination reaction is carried out and may be made, if so desired, a continuation of the chlorination cycle, it being understood that this invention does not require nor depend upon the use of any particular form of apparatus. As illustrative of a practical procedure for carrying out this invention, I took a sample of chlorinated rubber completely chlorinated, dissolved it in carbon tetrachloride, and subjected this to my viscosity reducing treatment in the manner indicated in the following table. For this I used 200 g. of a 15% chlorinated rubber solution in carbon tetrachloride.

| Temperature of treatment | Time of treatment | Air flow | Chlorine flow | Viscosity* cochius |
|---|---|---|---|---|
| °C. | Hrs. | Cc./min. | Cc./min. | Seconds |
| Original sample untreated | | | | 625 |
| 23 | 2 | 150 | 0 | 595 |
| 55 | 2 | 150 | 0 | 602 |
| 23 | 2 | 150 | 25 | 108 |
| 55 | 2 | 150 | 25 | 88 |

*Determined on the 15% solution in carbon tetrachloride by noting the time that it takes an air bubble 1 cm. long to ascend through 50 cm. of the solution in a tube 7 mm. in diameter at a temperature of 20° C.

From the above table it is apparent that passing air alone into the chlorinated rubber solution is substantially without effect on the viscosity, the differences shown being of the order of accuracy of the viscosity determinations. Air plus chlorine, however, has a substantial viscosity reducing effect.

As further illustrative of the viscosity-reducing effect of chlorine-air mixtures, I took a sample of chlorinated rubber in carbon tetrachloride not quite completely chlorinated and passed chlorine and air into this solution continuously for 62 hours, taking out samples at various intervals to determine the progress of the reduction in viscosity. The results obtained are shown in the following table.

| Time of treatment with chlorine and air, hours | Percent chlorine in chlorinated rubber | Viscosity in centipoises* |
|---|---|---|
| Original | 63.9 | 1,413 |
| 1.5 | 64.3 | 526 |
| 2.5 | 65.8 | 348 |
| 4 | 67.9 | 224 |
| 7.5 | 68.2 | 29 |
| 12 | 68.9 | 21 |
| 24 | 69.3 | 16 |
| 36 | 69.2 | 15 |
| 42 | 69.4 | 6.4 |
| 50 | 68.9 | 5.6 |
| 56 | 69.6 | 4.0 |
| 62 | 69.3 | 4.0 |

*Determined in a 20% by weight solution in toluene at 25° C.

From this table it is seen that chlorination is substantially completed after 12 hours of treatment. The 24 hour sample shows a chlorine content of 69.3% and a viscosity of 16 centipoises and thereafter the chlorine content remains substantially the same but the viscosity undergoes a very marked reduction.

My process thus provides a means whereby the viscosity of chlorinated rubber, substantially completely chlorinated, may be reduced without effect on the degree of chlorination of the chlorinated rubber. I have found that the method in accordance with this invention is particularly effective for producing chlorinated rubber with a viscosity less than 20 centipoises, the viscosity being determined in a 20% by weight solution in toluene at 25° C.

It will be understood that broadly this invention relates to a process for reducing the viscosity of chlorinated rubber, substantially completely chlorinated, comprising treating said chlorinated rubber dissolved in a solvent therefor with chlorine and an oxygen-containing gas for a period of time depending upon the viscosity of the final product desired. It will further be understood that the examples given are by way of illustration only and that various modifications may be made therein without departing from the scope of the invention.

Furthermore, it will be understood that in my process air, oxygen or any other gas containing uncombined oxygen may be used and will, hereinafter, be referred to as oxygen-containing gas.

What I claim and desire to protect by Letters Patent is:

1. A method for reducing the viscosity of substantially completely chlorinated rubber having a chlorine content of more than 68.9% which comprises treating said chlorinated rubber in solution in a solvent therefor with chlorine and an oxygen-containing gas and continuing said treatment until a chlorinated rubber having a pre-determined reduced viscosity is obtained.

2. A method for reducing the viscosity of substantially completely chlorinated rubber having a chlorine content of more than 68.9% which comprises treating said chlorinated rubber, in solution in a solvent therefor, continuously with a mixture of chlorine and an oxygen-containing gas and continuing the addition of said gas mixture until a chlorinated rubber having a pre-determined reduced viscosity is obtained.

3. A method for reducing the viscosity of substantially completely chlorinated rubber having a chlorine content of more than 68.9% which comprises treating said chlorinated rubber in solution in a solvent therefor, with an oxygen-containing gas to which small amounts of chlorine are added at intervals and continuing said treatment until a chlorinated rubber having a pre-determined reduced viscosity is obtained.

4. A method for reducing the viscosity of substantially completely chlorinated rubber having a chlorine content of more than 68.9% which comprises treating said chlorinated rubber, in solution in a solvent therefor, alternately with an oxygen-containing gas and chlorine and continuing said treatment until a chlorinated rubber having a pre-determined reduced viscosity is obtained.

5. A method for reducing the viscosity of substantially completely chlorinated rubber having a chlorine content of more than 68.9% which comprises treating said chlorinated rubber in solution in carbon tetrachloride with a mixture of chlorine and an oxygen-containing gas and continuing the addition of said gas mixture until a chlorinated rubber having a pre-determined reduced viscosity is obtained.

6. A method for reducing the viscosity of substantially completely chlorinated rubber having a chlorine content of more than 68.9% which comprises treating said chlorinated rubber in solution in a solvent therefor with a mixture of chlorine and an oxygen-containing gas, the amount of chlorine being from about 40% to about 99.5% by weight of said gas mixture and continuing the addition of said gas mixture until a chlorinated rubber having a pre-determined reduced viscosity is obtained.

7. A method for reducing the viscosity of substantially completely chlorinated rubber having a chlorine content of more than 68.9% which comprises treating said chlorinated rubber in solution in carbon tetrachloride with a mixture of chlorine and air, the amount of chlorine being from about 70% to about 98% by weight of said gas mixture, and continuing the addition of said gas mixture until a chlorinated rubber having a pre-determined reduced viscosity is obtained.

8. A method for reducing the viscosity of substantially completely chlorinated rubber having a chlorine content of more than 68.9% which comprises treating said chlorinated rubber in solution in carbon tetrachloride with a mixture of chlorine and air until a chlorinated rubber is obtained, having a viscosity less than about 20 centipoises.

J. MERRIAM PETERSON.